United States Patent [19]

Alanis

[11] Patent Number: 4,618,420
[45] Date of Patent: Oct. 21, 1986

[54] FILTER BAG FOR POOL CLEANERS

[75] Inventor: J. Jesus Alanis, San Marcos, Calif.

[73] Assignee: Alopex Industries, Inc., San Marcos, Calif.

[21] Appl. No.: 668,487

[22] Filed: Nov. 5, 1984

[51] Int. Cl.$^4$ .......................................... B01D 35/16
[52] U.S. Cl. ..................................... 210/169; 15/1.7;
210/416.2; 210/460; 55/368; 55/370; 55/381
[58] Field of Search ................ 15/1.7; 210/169, 416.2,
210/460; 55/368, 370, 371, 381

[56] References Cited

U.S. PATENT DOCUMENTS

| | | | |
|---|---|---|---|
| 1,264,989 | 5/1918 | Stecker | 55/368 |
| 1,383,615 | 7/1921 | Geier | 55/368 |
| 2,039,741 | 5/1936 | Richards | 55/368 |
| 2,364,069 | 12/1944 | Hahn | 55/368 |
| 2,897,915 | 8/1959 | Hastrup | 55/368 |
| 2,961,063 | 11/1960 | Fesco | 55/381 |
| 3,203,551 | 8/1965 | Van Loan, Jr. | 55/381 |
| 3,370,405 | 2/1968 | Fesco | 55/368 |
| 3,396,899 | 2/1976 | Henkin et al. | 15/1.7 |
| 3,762,562 | 10/1973 | Okuniewski et al. | 210/460 |
| 3,762,565 | 10/1973 | Okuniewski et al. | 210/460 |
| 3,822,754 | 7/1974 | Henkin et al. | 15/1.7 |
| 3,972,339 | 8/1976 | Henkin et al. | 15/1.7 |
| 4,119,414 | 10/1978 | Smaling | 55/368 |

OTHER PUBLICATIONS 4 pages of Advertising literature from Polaris-Vac-Sweep, San Marcos, CA, P.O. Box 1149, SL-1 printed 12/83.

*Primary Examiner*—Tim Miles
*Attorney, Agent, or Firm*—Fulwider Patton Rieber Lee & Utecht

[57] ABSTRACT

An improved filter bag is provided for swimming pool cleaners and the like particularly of the type designed for travel along submerged pool surfaces to dislodge and collect debris. The filter bag is formed from an elongated stretch of porous fabric, such as nylon mesh, folded upon itself to define conforming left and right sidewalls joined by front and rear seams and a seamless upper end. The lower ends of the sidewalls are secured to a mounting collar which cooperates therewith to define an open mouth for entry of debris into the bag and means for attachment about the discharge end of a pool cleaner suction mast. Water and debris are drawn by the cleaner through the mounting collar into a primary flow chamber within a forward region of the filter bag and separated from a rear collection chamber by an upstanding divider seam which terminates below the seamless upper end of the bag. In use, upon forward travel of the pool cleaner within a swimming pool, water flows relatively efficiently through the primary flow chamber and exits the bag through the seamless upper end, while debris drawn upwardly within the primary flow chamber is guided rearwardly over the divider seam and settles within the rear collection chamber. A portion of the rear seam is defined by separable Velcro-type fastener strips to permit removal of debris from the collection chamber without requiring removal of the filter bag from the pool cleaner.

19 Claims, 6 Drawing Figures

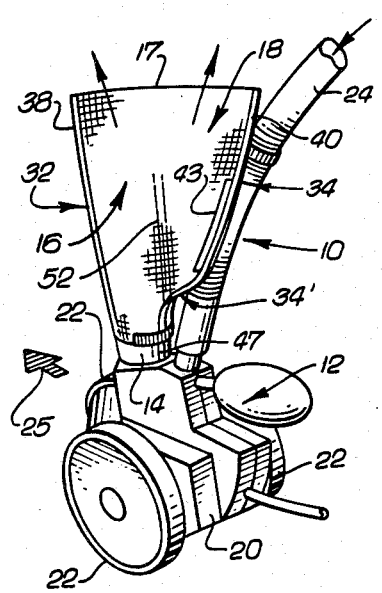

FILTER BAG FOR POOL CLEANERS

BACKGROUND OF THE INVENTION

This invention relates generally to improvements in filter bags for use with automatic pool cleaning devices, particularly of the type designed for submerged travel along the floor and subsurface sidewalls of a swimming pool to collect and dislodge debris. More particularly, this invention relates to an improved filter bag designed for improved operating efficiency of the pool cleaner and for facilitated removal of collected debris from the filter bag.

Residential and commercial swimming pools conventionally include water filtration systems designed for removing dirt and debris from the pool water. Such filtration systems include a circulation pump for pumping pool water through a filter unit which separates dirt and other suspended debris from the water, after which the pool water is returned to the swimming pool. To maintain desired standards of water cleanliness and clarity, such filtration systems are normally required to be operated on a daily schedule for at least several hours each day.

While a swimming pool filtration system for the type described above is esential for maintaining water cleanliness and clarity, such filtration systems by themselves are generally unable to maintain the pool water is a satisfactory state of cleanliness over a long period of time. For example, a conventional water filtration system is designed to remove suspended water-entrained debris of a relatively small size and not for removing larger debris, such as leaves and the like, or other particulate matter which tends to settle irrespective of size onto the floor and sidewalls of the pool. Accordingly, periodic cleaning of the pool floor and sidewalls by additional means is required to maintain the pool in a clean condition.

In recent years, a variety of in-the-pool cleaning devices have become popoular for dislodging and collecting debris and sediment from the floor and sidewall surfaces of a swimming pool. See, for example, the pool cleaning device shown and described in U.S. Pat. No. 3,822,754 which is adapted for sumberged and generally random travel along the pool floor and sidewalls, wherein such devices are exemplified by the pool cleaner manufactured and sold by Polaris Vac-Sweep of San Marcos, California, under the trademark POLARIS VAC-SWEEP. Cleaning devices of this type are designed for connection to a supply of water under pressure, such as by connection to the discharge side of a filtration system circulation pump, and are driven hydraulically over submerged pool surfaces to dislodge sediment and further include hydraulic suction means for drawing sediment and debris through a suction mast into a porous collection of filter bag.

In general, filter bags for pool cleaners have been formed from a meshlike material sewn into a shape having a lower open mouth for attachment about the upper end of the pool cleaner suction mast. Accordingly, water drawn upwardly into the filter bag passes through the meshlike material for return to the pool whereas water-entrained debris is trapped and collected within the bag. However, in previous filter bags, debris has tended to collect within the bag in a position obstructing water flow from the suction mast thereby inhibiting cleaner effectivity. This problem is compounded by the fact that the collected debris tends to fall back through the suction mast into the swimming pool upon cessation of cleaner operation. Moreover, previous collection bags have commonly included a stitched seam or the like closing the upper end of the bag, wherein this seam also interferes with and partially obstructs upward water flow from the suction mast to reduce cleaner efficiency. Still further, previous filter bags generally have been shaped with a relative broad front profile resulting in significant drag as the bag and cleaner move together through the pool water, wherein this drag can be sufficient to tip the cleaner and prevent desired suction operation. In addition, when collected debris is emptied from the filter bag, it has generally been necessary to remove the bag from the pool cleaner resulting in potential debris spillage onto the pool cleaner, wherein the spilled debris can contact cleaner drive machanisms and undesirably interfere with proper operation thereof.

There exists, therefore, a significant need for an improved filter bag for pool cleaners, wherein the filter bag is designed for improved hydraulic operating characteristics and for facilitated bag emptying, particularly without requiring bag removal from the pool cleaner.

SUMMARY OF THE INVENTION

In accordance with the invention, an improved filter bag is provided for use with pool cleaners and the like for improved hydraulic efficiency and debris collection in use and for facilitated removal of debris from within the filter bag. The improved filter bag is formed from porous fabric or the like folded upon itself and seamed together to include an open lower mouth for attachment to the suction mast of the pool cleaner and a seamless upper end to permit substantially unimpeded water flow therethrough. The interior of the bag is divided into a forward primary flow chamber for upward passage of water and entrained debris from the lower mouth to the seamless upper end whereat the debris is guided rearwardly into a rear collection chamber for settling and storage. A rear seam for the filter bag is defined at least in part by attachable Velcro-type fastener strips which can be separated to permit bag emptying without requiring bag removal from the pool cleaner.

In the preferred form of the invention, the filter bag is formed from an elongated stretch of a nylon mesh fabric or the like folded upon itself to define conforming left and right sidewalls joined seamlessly at their upper ends. These sidewalls are joined along their front margins by a front seam and along their rear margins by the rear seam, wherein these seams desirably include reinforcing fabric strips of cotton or the like. The sidewalls include overlapping lower extensions adjacent their front margins and joined to a mounting collar sized to fit over the discharge end of the pool cleaner suction mast, with appropriate securing means being carried by the mounting collar for securely fastening said collar about the suction mast.

The mounting collar cooperates with the lower end of the filter bag to define an open mouth for entry of water and entrained debris drawn through the suction mast by the pool cleaner. This water and entrained debris flows upwardly into a primary flow chamber defined by a forward region of the interior bag volume between the front seam and an intermediate divider seam upstanding from a rear margin of the mounting collar and terminating below the seamless bag upper end. Water flowing upwardly through the primary flow chamber passes without significant hydraulic obstruction through the seamless upper end to return to the swimming pool, whereas the debris is guided rearwardly between the sealess upper end and the divider seam as the cleaner travels forwardly within the pool for debris passage into the rear collection chamber for settling between the divider seam and the rear seam of the filter bag.

Collected debris within the rear collection chamber is thus maintained in a position away from the mounting collar and further away from the upward water flow path through the primary flow chamber. Accordingly, the collected debris does not interfere with water flow through the suction mast whereby cleaner suction effectiveness is substantially optimized. Moreover, orientation of the filter bag on the pool cleaner with the front and rear seams aligned generally in a fore-aft direction provides a minimal front bag profile to correspondingly minimize hydraulic drag attributable to the bag as the cleaner moves through the water. When the filter bag is full or otherwise requires emptying, a portion of the rear seam defining by the Velcro-type fastener strips is conveniently separated to provide a discharge opening for debris removal into a collection vessel without requiring removal of the bag from the cleaner and further without significant risk of debris falling onto the underlying cleaner.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of an in-the-pool cleaner having mounted thereon an improved filter bag embodying the novel features of the invention;

FIG. 2 is an enlarged side elevation view of the pool cleaner and filter bag, illustrating the filter bag partially in vertical section;

FIG. 3 is a fragmented horizontal section taken generally on the line 3—3 of FIG. 2;

FIG. 4 is a fragmented vertical section taken generally on the line 4—4 of FIG. 2.

DETAILED DESCRIPTION OF THE PREFERRED EMBODIMENT

Figure 5:
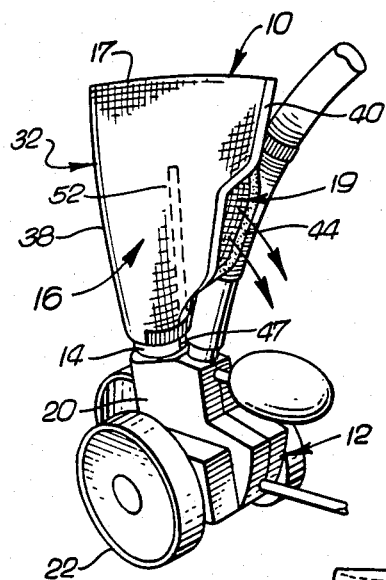
FIG. 5 is a perspective view similar to FIG. 1 and illustrating removal of collected debris from the improved filter bag.

As shown in the exemplary drawings, an improved filter bag referred to generally by the reference numeral 10 is provided for use with an in-the-pool cleaner 12 of the type designed for generally random travel over the floor and sidewall surfaces of a swimming pool (not shown) or the like. The improved filter bag 10 is removably mounted onto the upper end of a suction mast 14 of the pool cleaner 12 for reception of a flow of water including entrained debris and other particulate suctioned from submerged pool surfaces. This water and entrained matter flows upwardly within the filter bag 10 through a primary flow chamber 16, with the water exiting the bag through a seamless upper end 17 and the debris falling rearwardly for collection into a rear collection chamber 18.

The improved filter bag 10 of the present invention provides significant improvements in operation and use in comparison with previous filter bags used with pool cleaners of a generally similar type. More particularly, in the improved filter bag 10, debris is collected and stored within the rear collection chamber 10 where it does not interfere with hydraulic flow of water upwardly through the primary flow chamber 16. Accordingly, substantially optimum suction flow characteristics for maximum cleaner efficiency are maintained through the filter bag at all times wherein these optimal flow characteristics are further enhanced by the seamless upper end 17 of the bag which does not significantly obstruct water flow. Moreover, the improved filter bag 10 is shaped to provide a narrow, substantially minimum front profile to correspondingly minimize hydraulic drag within the water during pool cleaner movement, wherein such drag could otherwise cause partial tipping of the pool cleaner 12 to interfere with debris suction and collection capability. In addition, debris collected within the rear collection chamber 18 can be emptied from the filter bag 10 through a rear discharge opening 19 (FIG. 5) without requiring bag removal from the pool cleaner and further substantially without risk of spilling collected debris onto or within the pool cleaner.

The improved filter bag 10 shown in FIGS. 1-5 is designed particularly for use with pool cleaners of the type shown and described, for example, in U.S. Pat. No. 3,822,754, wherein such devices are exemplified by the pool cleaner manufactured and sold by Polaris Vac-Sweep of San Marcos, California, under the trademark POLARIS VAC-SWEEP. In such pool cleaners with reference to the illustrative cleaner 12, a cleaner housing 20 is supported on a set of wheels 22 for transport in a generally random pattern over the floor and submerged sidewall surfaces of a swimming pool. An hydraulic drive train (not shown) encased within the cleaner housing 20 responds to a supply of water under pressure coupled to the cleaner via a supply hose 24 to drive the wheels 22 relatively slowly in a forward direction, as indicated by arrow 25. In addition, a portion of the water from the supply hose 24 is utilized to induce a suction flow upwardly through the cleaner supply mast 14, wherein this suction flow draws water along with debris, such as leaves and other particulate, from the pool surface underlying the cleaner housing 20 for debris collection within the filter bag 10. One exemplary construction and operation of the hydraulic drive train and exemplary means for inducing suction flow through the mast 14 are shown and described in detail in the above-referenced U.S. Pat. No. 3,822,754, which is incorporated by reference herein.

As shown in detail in FIGS. 1-4, the improved filter bag 10 of the present invention is formed from an elongated stretch of a porous material, such as fine nylon mesh fabric or other selected water-pervious material, folded upon itself to define the seamless upper end 17 extending generally in a fore-aft direction when installed on the pool cleaner 12. When folded, the bag material includes left and right sidewalls 28 and 30 of generally conforming overlapping shape with aligned front margins 32 and rear margins 34. The front margins 32 of the sidewalls 28 and 30 are joined together by a generally upright front seam 38 formed preferably by stitching and incorporating a stitched-in reinforcing strip 39 of a fabric material, such as cotton or the like.

The rear margins 34 of the bag sidewalls 28 and 30 extend from the seamless upper end 17 generally in a downward direction and with a gradual curvature in a forward direction, as shown best in FIG. 2, to provide the filter bag with a fore-aft dimension which decreases gradually toward the lower end of the bag. Near the lower end of the filter bag, these rear margins 34 turn more sharply in a forward direction to define lower rear margins 34'.

A rear seam 40 also formed preferably by stitching extends from the seamless upper end 17 downwardly along the rear margins 34 for a short distance through an upper region of the bag to attach the rear margins together, with a pair of stitched-in reinforcing strips 41 and 42 of fabric or the like overlying the respective rear margins of the sidewalls 28 and 30. However, in a central region of the bag rear margins 34, the seam 40 splits into a pair of separate subseams 40' affixing the reinforcing strips 41 and 42 respectively to the rear margins of the sidewalls but otherwise leaving the rear margins unattached to provide the discharge opening 19 for removal of collected debris, as will be described in more detail. Importantly, throughout the height of the discharge opening 19, the subseams 40' respectively anchor attachable fasteners, such as hook and pile Velcro-type fastener strips, 43 and 44 for releasably closing the discharge opening 19. At the lower extent of these fastener strips 43 and 44, the rear seam 40 resumes attachment of the sidewalls 28 and 30 at their lower rear margins 34'.

As shown best in FIGS. 1 and 2, the bag sidewalls 28 and 30 include overlapping lower extensions adjacent the front seam 38, with the front seam 38 continuing downwardly a sufficient distance to attach the front margins of these extensions to one another. A flexible split mounting collar 46 of fabric or other suitable material is secured as by stitching into these lower extensions to position an upstanding rear split 47 in the collar 46 generally at the rear thereof. The rear seam 40 continues downwardly from the lower rear margins 34' of the bag sidewalls to secure the reinforcing strips 41 and 42 and the rear margins of the extensions respectively to the rear margins of the mounting collar 46 adjacent this rear split 47.

The illustrative flexible mounting collar 46, when installed into the lower bag extensions, has a size and shape for relatively easy reception over the upper end of the suction mast 14 of the pool cleaner 12. In this position, interlocking fasteners 48 and 49 preferably such as hook and pile Velcro-type strips mounted as by stitching onto the collar 46 at opposite sides of the split 47 are securely engageable with one another to lock the mounting collar onto the cleaner suction mast. When so installed, the filter bag 10 projects upwardly above the suction mast 14 with the seamless upper end 17 oriented generally in a fore-aft direction, as shown best in FIG. 3, to provide the bag 10 with a narrow front profile, thereby minimizing drag within the water as the cleaner moves forwardly during a cleaning procedure. Conveniently, additional Velcro-type fastener strips indicated generally by reference numeral 50 may be incorporated into the rear seam 40 near the top of the bag for releasable attachment about the water supply hose 24 to maintain the bag in a generally upright configuration at all times.

In accordance with a primary aspect of the filter bag 10 of the present invention, the interior volume of the filter bag is divided into the primary flow chamber 16 generally at a forward region of the bag and the collection chamber 18 generally at a rearward region of the bag. More specifically, the bag sidewalls 28 and 30 are joined together by an upstanding intermediate divider seam 52 formed preferably by stitching and incorporating a stitched-in reinforcing strip 53 of fabric or the like. This divider seam 52 extends from a lower end generally at the lower rear margins 34' of the sidewalls and aligned generally over the rear split 47 in the mounting collar in an upward direction generally in parallel with the front seam 38 to divide the interior bag volume into the primary flow chamber 16 aligned over the mounting collar 46 and the rear collection chamber 18 displaced behind the collar 46. Importantly, this divider seam 52 terminates sufficiently below the seamless upper end 17 of the bag to provide a relatively open transition region 54 communicating between the upper ends of the chambers 16 and 18.

When installed onto the pool cleaner 12, water and entrained debris and other particulate is suctioned upwardly through the cleaner suction mast 14 and further through the mounting collar 46 into the bag interior within the primary flow chamber 16. This water and debris flow is maintained in space relation from the rear collection chamber throughout the height of the divider seam 52. Further upward water flow within the primary flow chamber 16 guides the water for exit passage from the bag substantially without significant hydraulic obstruction through the seamless upper end 17, as depicted by arrows 55 in FIG. 2. However, due to forward movement of the cleaner 12 through the swimming pool, water-entrained debris and other particulate which cannot pass through the bag material tends to guide rearwardly through the transition region 54 over the divider seam 52 for settling and storage into the rear collection chamber 18, as depicted by arrows 57 in FIG. 2. Accordingly, the debris and particulate is collected in a position spaced behind the primary flow chamber 16 and prevented by the divider seam 52 from falling back into the suction mast 14 when pool cleaner operation is halted.

When it is desired to empty collected debris and particulate from the filter bag 10, the Velcro-type fastener strips 43 and 44 along the rear margins 34 of the bag are quickly and easily separated from one another thereby opening the discharge opening 19, as viewed in FIG. 5. The collected debris and the like can then be dumped quickly and easily into an appropriate collection vessel (not shown) without significant risk of debris spillage onto or into the housing 20 of the pool cleaner 10 and further without removing the bag from the suction mast 14 of the cleaner. When the bag is emptied, the fastener strips 43 and 44 can be reattached and the entire unit returned to normal operation.

Figure 6:
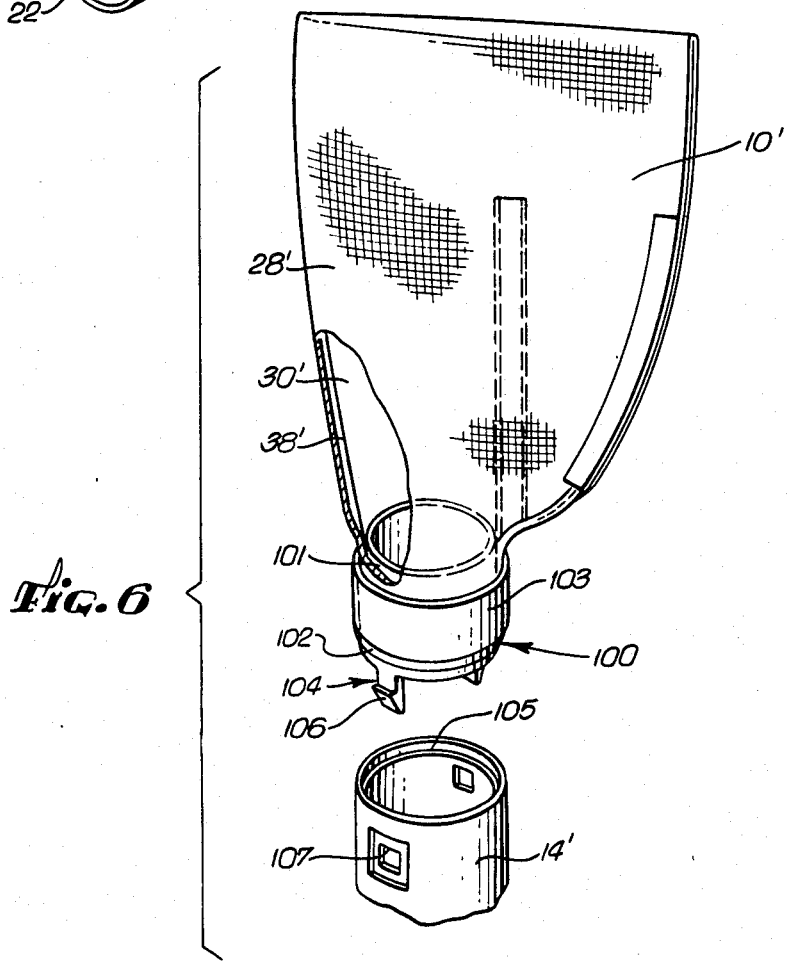
FIG. 6 is a fragmented perspective view illustrating an alternative form of the improved filter bag including an alternative mounting collar for mounting onto a pool cleaner.

FIG. 6 illustrates an alternative form of the filter bag of the present invention, wherein the bag has been modified to include an alternate mounting collar means for mounting onto the suction mast of a pool cleaner, with components corresponding to those shown and described in FIGS. 1-5 being referred to by common primed reference numerals. More specifically, as shown, the overlapping lower extensions of the bag sidewalls 28' and 30' adjacent the front seam 38' are joined fore and aft respectively to one another by the front seam 38' and the rear seam to form an open mouth for attachment about a mounting ring 100 designed for rapid and simpified installation and/or removal with respect to the upper end of the pool cleaner suction mast 14' of the type shown and described in commonly assigned U.S. application Ser. No. 574,293, filed Jan. 26, 1984.

This mounting ring 100 comprises an upstanding support cylinder 101 which projects upwardly a substantial distance to the open mouth of the filter bag 10'. This support cylinder 101 has a lower end joined to an enlarged flange 102 with the filter bag being drawn over the support cylinder 101 into a position near or abutting the flange 102, after which an outer locking sleeve 103 is snugly seated about the bag and support cylinder 101 to lock the bag in place. A suitable adhesive may be provided between the sleeve 103 and the support cylinder 101 to permanently secure the bag, if desired.

Below the flange 102 the mounting ring 100 is shaped for sliding reception into a shallow counterbore 105 at the upper end of the suction mast 14' and further into flush annular supported engagement with the lower extent of the counterbore. A pair of latch clips 104 project downwardly from the mounting ring 100 beyond the counterbore and terminate in outwardly presented and downwardly pointed wedge plates 106. These latch clips are designed for resilient displacement toward each other for reception of the wedge plates 106 downwardly into the suction mast upper end, followed by resilient outward movement for locked and seated reception into matingly shaped openings 107 formed near the upper end of the suction mast. Accordingly, the mounting ring can be installed rapidly onto the suction mast and further may be removed easily by mere inward depression on the wedge plates 106 followed by separation of the mounting ring 100 and bag 10' from the suction mast.

The improved filter bag 10 of this invention thus provides for improved hydraulic cleaning operation of the pool cleaner 12 by collecting and storing debris in a position spaced from water flow through the suction mast and further by permitting substantially unimpeded water discharge from the filter bag. When full, the bag is designed for rapid and easy emptying without requiring bag removal from the pool cleaner.

A variety of modifications and improvements to the improved filter bag of the present invention are believed to be apparent to those skilled in the art. Accordingly, no limitation on the invention is intended by way of the foregoing description, except as set forth in the appended claims.

What is claimed is:

1. A filter bag for use with a pool cleaner having a suction mast for flow of water and debris drawn from a swimming pool or the like, said bag comprising:
   a pair of sidewalls of generally common shape and formed from a material pervious to water flow and generally impervious to passage of debris therethrough, said sidewalls being joined together by a seamless upper end and having generally aligned front margins and rear margins;
   means for interconnecting said sidewalls along said front margins and along said rear margins, said interconnecting means being releasably separable over at least a portion of said rear margins to define a debris discharge opening;
   a mounting collar carried by said sidewalls generally at the lower ends thereof and generally adjacent said front margins for mounting said bag onto the discharge end of the pool cleaner suction mast, said mounting collar cooperating with said sidewalls to define an open mouth for passage of water and debris drawn through the suction mast into the bag interior between said sidewalls; and
   means for dividing the bag interior into a primary flow chamber disposed generally adjacent said front margins in flow communication with the open mouth defined by said collar and a collection chamber disposed generally adjacent said rear margins and having a lower end blocked from direct flow communication with the open mouth and an upper end in flow communication with the primary flow chamber, said divider means comprising a divider seam interconnecting said sidewalls and extending generally upwardly from the side of said mounting collar opposite said front margins and terminating in spaced relation below said seamless upper end, whereby water flowing through the open mouth passes through the primary flow chamber and exits the bag generally through the seamless upper end and debris flowing through the open mouth passes through the primary flow chamber and settles within the collection chamber.

2. The filter bag of claim 1 wherein said sidewall material is nylon mesh fabric.

3. The filter bag of claim 1 wherein said sidewalls are formed from an elongated stretch of the material folded upon itself to define said seamless upper end.

4. The filter bag of claim 3 wherein said sidewalls include overlapping extensions at their lower ends generally adjacent said front margins, said collar comprising a generally cylindrical member secured to said extensions.

5. The filter bag of claim 4 wherein said collar has a split, flexible construction and further including means for releasably securing said collar about the pool cleaner suction mast.

6. The filter bag of claim 5 wherein said releasable securing means comprises an attachable pair of Velcro-type fastener strips.

7. The filter bag of claim 5 wherein said releasable securing means comprises at least one latch clip projecting from said cylindrical member and springably movable for releasably engaging the pool cleaner suction mast.

8. The filter bag of claim 1 wherein said rear margins of said sidewalls extend from said seamless upper end downwardly and with a generally forward component of direction toward said mounting collar.

9. The filter bag of claim 1 wherein said rear margins are releasably separable generally over an intermediate region thereof.

10. The filter bag of claim 1 including an attachable pair of fastener strips mounted respectively at the rear margins of said sidewalls over a portion of said rear margins and releasably separable to define the debris discharge opening.

11. The filter bag of claim 1 wherein said interconnecting means comprises a front seam and a rear seam.

12. The filter bag of claim 1 wherein said divider seam includes a stitched-in reinforcing strip.

13. The filter bag of claim 1 wherein said divider seam extends generally in parallel with said front margins.

14. The filter bag of claim 1 wherein the pool cleaner includes a water supply hose, and further including support means adjacent the seamless upper end for securing the bag to the water supply hose.

15. The filter bag of claim 1 wherein the bag has a narrow front profile.

16. A filter bag for use with a pool cleaner having a suction mast for flow of water and debris drawn from a swimming pool or the like, said bag comprising:
 a bag member formed from a material previous to water flow and generally impervious to passage of debris therethrough, said bag member defining a substantially closed interior volume having an open mouth at the lower end thereof, said bag member being formed with a pair of sidewalls having generally aligned front margins and rear margins and further including means for interconnecting said front margins and said rear margins;
 means for mounting said bag member onto the discharge end of the pool cleaner suction mast for passage of water and debris drawn through the suction mast into the interior volume; and
 means for dividing the bag member interior volume into a primary flow chamber disposed generally over said open mouth and a collection chamber spaced generally laterally from said open mouth and blocked from direct flow communication therewith, said primary flow chamber being disposed generally adjacent said front margins and said collection chamber being disposed generally adjacent said rear margins, said divider means comprising a divider seam interconnecting said sidewalls and extending generally upwardly from the side of said open mouth opposite said front margins and terminating in spaced relation below the upper end of said bag member whereby water and debris entering said bag member through said open mouth passes through the primary flow chamber with the water exiting through the bag member material and the debris passing into said collection chamber.

17. The filter bag of claim 16 wherein said bag member has a seamless upper end.

18. The filter bag of claim 16 including means for releasably accessing said collection chamber from the exterior of said bag member to permit removal of collected debris therein.

19. A filter bag for use with a pool cleaner having a suction mast for flow of water and debris drawn from a swimming pool or the like, said bag comprising:
 a bag member formed from an elongated stretch of material pervious to water flow and generally impervious to passage of debris therethrough, said stretch of material being folded generally upon itself to define a generally identical pair of overlapping sidewalls joined by a seamless upper end and having generally aligned front margins and rear margins, said sidewalls further including overlapping extensions at their lower ends generally adjacent said front margins;
 a front seam interconnecting said front margins and extending generally from said seamless upper end downwardly to the lower ends of said extensions;
 a mounting collar carried by said extensions and including means for mounting onto the discharge end of the pool cleaner suction mast, said collar defining an open mouth generally at a lower and forward region of said bag member for passage of water and debris drawn through the suction mast into said bag member;
 a rear seam interconnecting said rear margins and extending generally from said seamles upper end downwardly toward the lower ends of said sidewalls and then generally forwardly to a rear margin of said mounting collar, said rear seam including releasably attachable means over at least a portion of the length thereof to permit selective access to the interior of said bag member; and
 a divider seam interconnecting said sidewalls and extending generally upwardly from the side of said mounting collar opposite said front margins and terminating in spaced relation below said seamless upper end, said divider seam cooperating with said sidewalls and said front and rear seams to define a primary flow chamber disposed generally over said open mouth and a collection chamber spaced behind said primary flow chamber and blocked from direct flow communication with said open mouth, said collection chamber having an upper extent in direct flow communication with said primary flow chamber, whereby water and debris entering said bag member through said open mouth passes through the primary flow with the water exiting generally through said seamless upper end and the debris passing rearwardly into and settling within said collection chamber.

* * * * *